United States Patent [19]
Burch

[11] Patent Number: 5,860,615
[45] Date of Patent: Jan. 19, 1999

[54] TOOL INCLUDING WINDING SPINDLE FOR WINDING AND FORMING DYNAMOELECTRIC MACHINE FIELD WINDINGS

[75] Inventor: Jerry C. Burch, Northridge, Calif.

[73] Assignee: Labinal Components and Systems, Inc., Lombard, Ill.

[21] Appl. No.: 821,647

[22] Filed: Mar. 20, 1997

Related U.S. Application Data

[63] Continuation-in-part of Ser. No. 550,177, Oct. 30, 1995, Pat. No. 5,732,900.

[51] Int. Cl.$^6$ .................................................. B65H 81/06
[52] U.S. Cl. ............................... 242/432.5; 242/432.6; 29/596; 29/736
[58] Field of Search ............................ 242/432.3, 432.4, 242/432.5, 432.6; 29/736, 732, 596, 605

[56] References Cited

U.S. PATENT DOCUMENTS

| | | |
|---|---|---|
| 2,998,937 | 9/1961 | Potter et al. . |
| 3,334,825 | 8/1967 | Friedrich . |
| 3,629,925 | 12/1971 | Brown, Jr. et al. .......................... 29/205 |
| 3,753,282 | 8/1973 | Wiehl ........................................ 29/205 |
| 3,841,133 | 10/1974 | Rice, Jr. ..................................... 72/168 |
| 3,856,221 | 12/1974 | Arick et al. . |
| 3,903,933 | 9/1975 | Arick et al. ............................. 140/92.1 |
| 3,913,373 | 10/1975 | Kindig ...................................... 72/355 |
| 3,985,163 | 10/1976 | Vogel et al. ............................ 140/92.1 |
| 3,985,164 | 10/1976 | Grawcock ............................... 140/92.1 |
| 4,033,385 | 7/1977 | Taube ..................................... 140/92.1 |
| 4,051,595 | 10/1977 | Bale ......................................... 29/596 |
| 4,106,189 | 8/1978 | Peters ...................................... 29/736 |
| 4,290,190 | 9/1981 | Arnold ..................................... 29/596 |
| 4,724,604 | 2/1988 | Kawazoe et al. ........................ 29/606 |
| 5,056,212 | 10/1991 | Scherer ................................. 29/564.5 |
| 5,113,573 | 5/1992 | Taji et al. .................................. 29/596 |
| 5,134,769 | 8/1992 | Scherer .................................... 29/596 |
| 5,235,738 | 8/1993 | Eminger .................................. 29/736 |
| 5,316,227 | 5/1994 | Oohashi et al. . |

Primary Examiner—Donald P. Walsh
Assistant Examiner—Emmanuel M. Marcelo
Attorney, Agent, or Firm—Biebel & French

[57] ABSTRACT

A winding and forming tool attachable to a winding machine spindle shaft for reciprocating movement along and rotational movement about a longitudinal axis thereof includes an elongated winding spindle having generally radially extending slots therethrough located at longitudinally spaced apart locations along the winding spindle, and a plurality of forming racks are provided, each of the forming racks being slidably disposed within one of the generally radially extending slots. A rotatable spline shaft is at least partially disposed within the winding spindle for engaging the forming racks in a manner causing sliding movement of the forming racks along the slots to extend and retract them relative to an external surface of the winding spindle. A wire is guided internally through the winding spindle from one end thereof to an aperture in a radially facing external surface of the winding spindle. In one embodiment, the aperture is defined by a wire access recess insert and an adjacent portion of the winding spindle. The insert is removably attached to the winding spindle within a wire access recess which provides access to a cavity within the winding spindle.

20 Claims, 6 Drawing Sheets

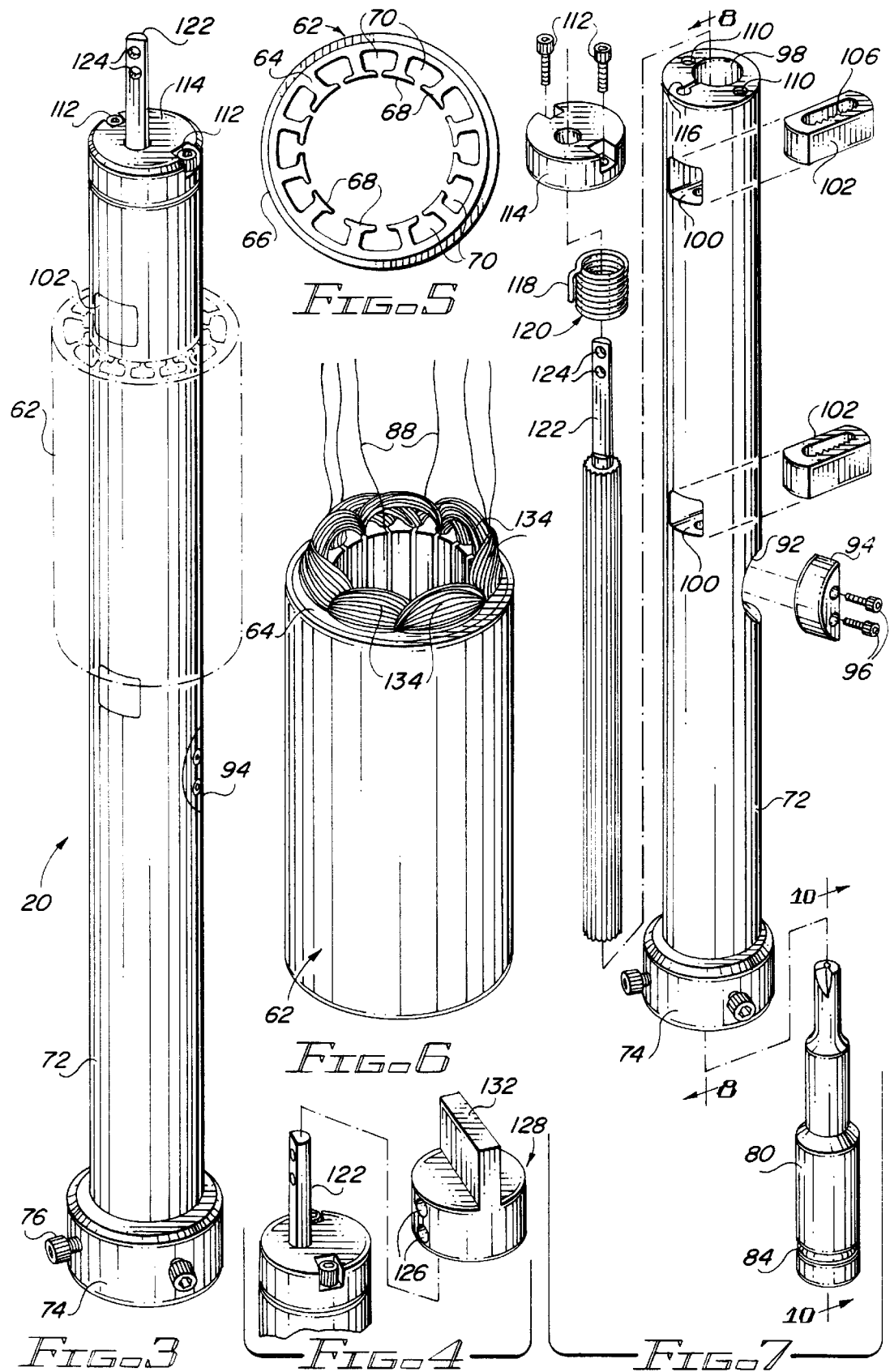

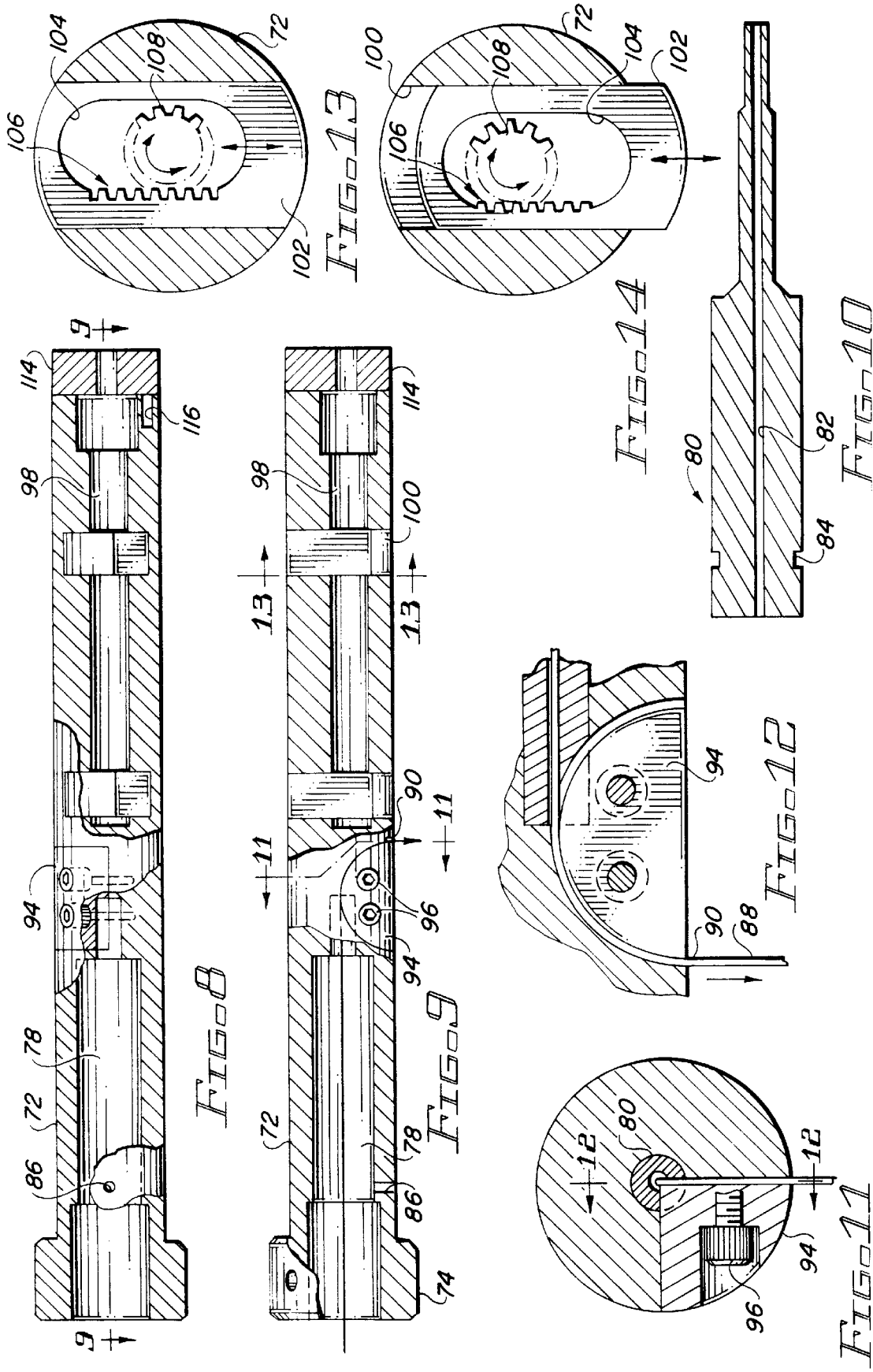

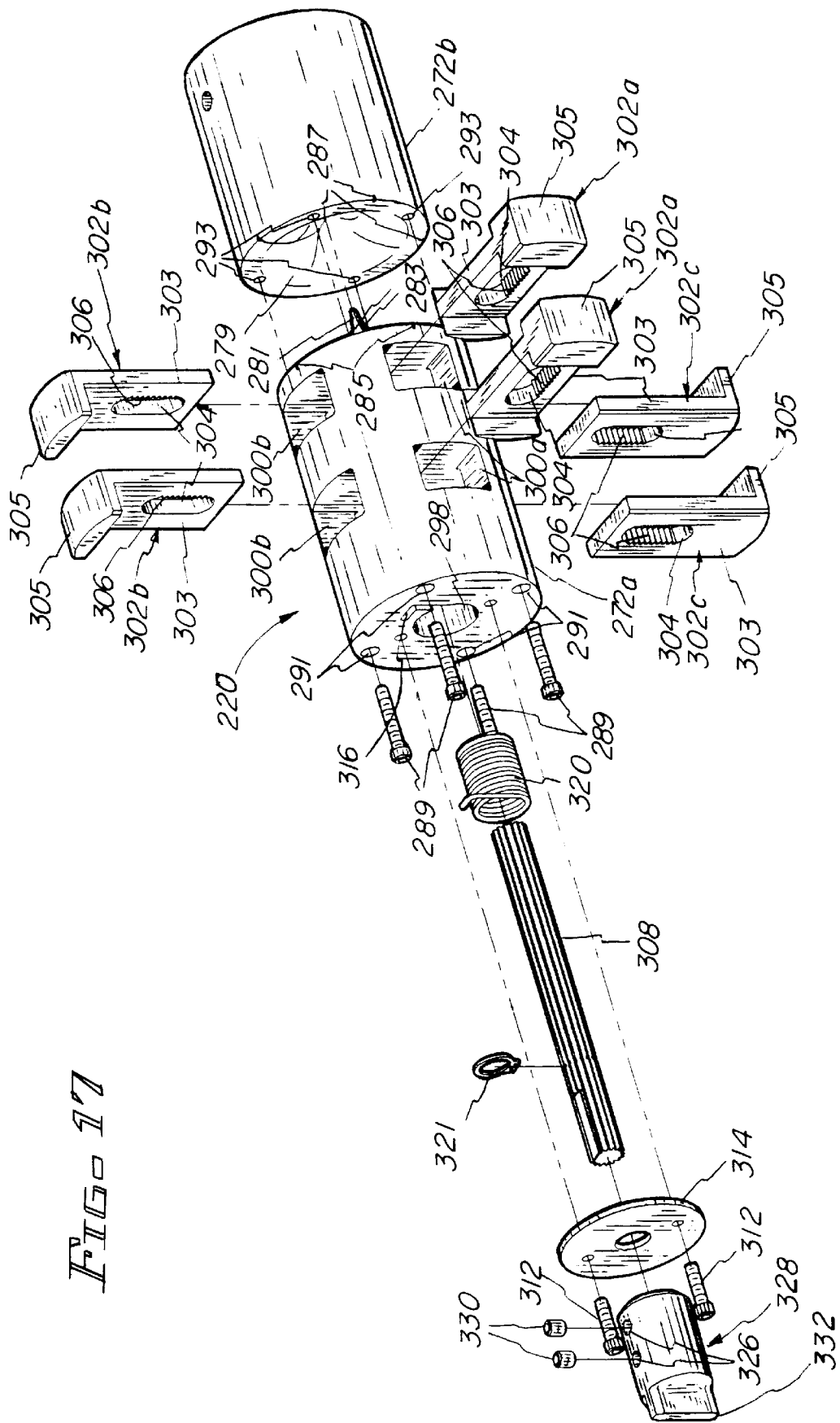

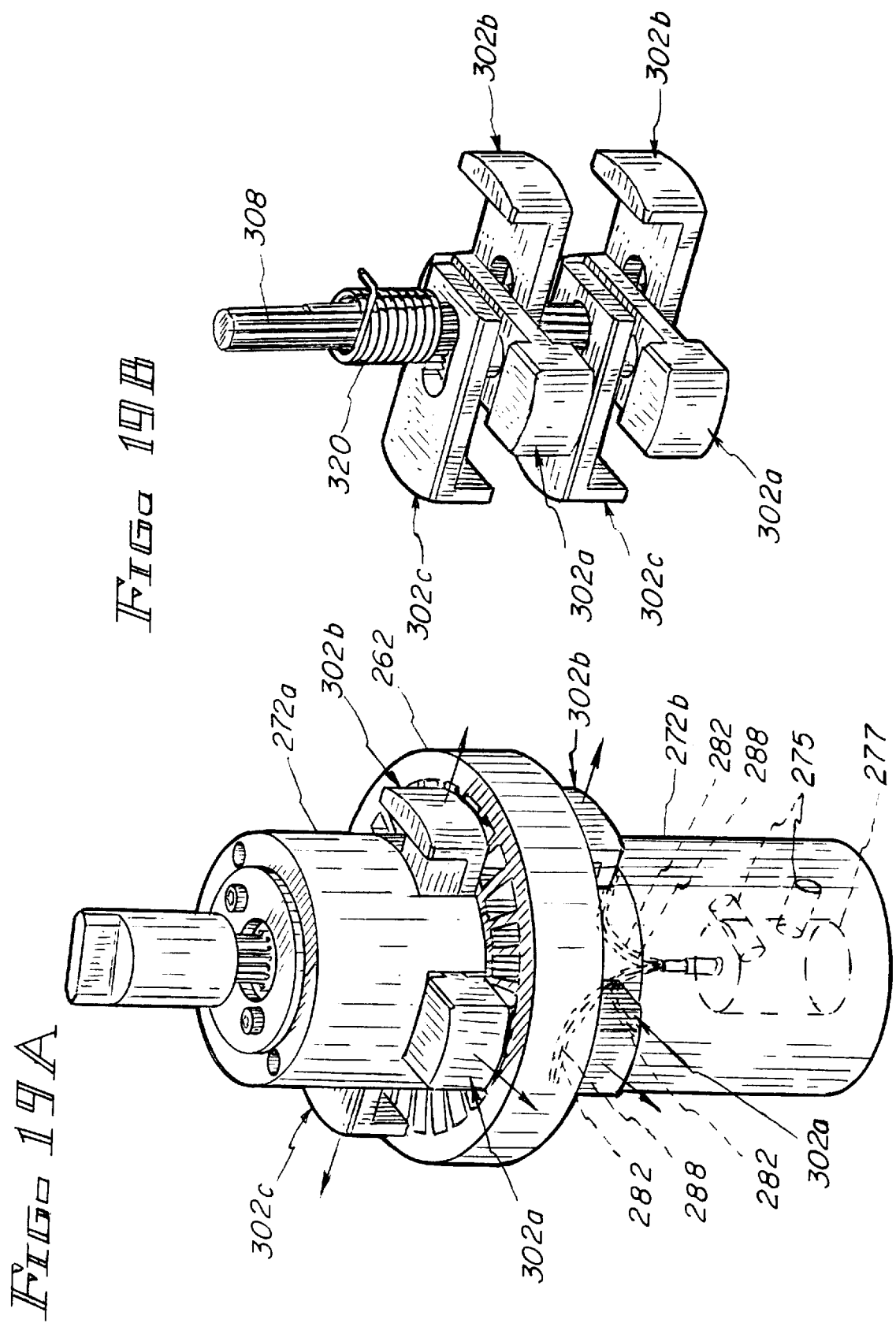

TOOL INCLUDING WINDING SPINDLE FOR WINDING AND FORMING DYNAMOELECTRIC MACHINE FIELD WINDINGS

RELATED APPLICATION

The present application is a continuation-in-part of application Ser. No. 08/550,177 filed Oct. 30, 1995 now U.S. Pat. No. 5,732,900.

BACKGROUND OF THE INVENTION

This invention relates generally to the manufacture of stators for electric motors. More particularly, the present invention relates to a method and apparatus for winding and forming dynamoelectric machine field windings, and particularly, final forming of stator coil end turns.

In many conventional dynamoelectric machines, for example fractional horsepower induction motors, the magnetic stator core comprises a stacked plurality of relatively thin laminations of magnetic material having a central bore which receives the rotor member of the machine. A plurality of slots extend radially inwardly from the bore for receiving the field coils of the machine, wherein such slots are defined by radially extending teeth. A predetermined number of turns of insulated wire conductor are arranged within such slots to form the excitation windings of the motor. These coils have end turn portions extending outside the slots axially beyond the sides or end faces of the stator core.

In the past, two different types of apparatus have been employed for placing dynamoelectric machine field windings in the slots of the stator core member. In the so-called coil-insertion or coil-injection apparatus, prewound coils are first placed on a circular array of elongated blades. The stator core is then positioned on the blades with the blades respectively engaging the inner ends of the stator core teeth, and the coils are then pushed bodily into the stator core member slots. The coils for use with such coil-insertion apparatus are typically formed by securing the free end of the wire to a coil form and then winding or wrapping the wire around the coil form as the wire is withdrawn from the source, the wire being placed in tension as it is being wound.

In the so-called in-place or gun winder, a free end of the wire is secured and a gun is oscillated through the bore of the core member thereby withdrawing the wire from a source and placing it directly in the desired slots. Since the free end of the wire is fixed, the wire is in essence wound around selected teeth which define the slots thereby placing the wire under tension.

After the coils have been placed within the stator core, the return ends of the coils extend out of the stator slots and beyond the ends of the stator core. For reasons of appearance as well as customer specifications, the coil ends need to be shaped into a particular desired configuration. Such shaping operations are conventionally referred to as forming or blocking operations and typically have included a preforming operation wherein the wire was moved out of the extended bore of the stator and a final forming operation in which the end wires were shaped into the desired configuration. In the past, the preforming and final forming operations consisted of two distinct operations wherein, during the preforming operation, a preforming arbor was inserted into and extended through the bore of the stator to push the wires back from the extended stator bore. After this preforming operation the stator was transferred to another machine for final forming of the wire.

Drawbacks associated with prior stator winding and forming apparatus and methods include performing the winding and forming operations at different stations under different procedures. Further, in some prior devices the coil end turn wires have tended to be pinched. Such pinching is likely to undesiveably damage the wire or the wire insulation. Accordingly, there is a need for a tool for winding and forming dynamoelectric machine field windings which is of relatively simple construction, lends itself to use in a so-called in-place or gun winder, and provides for the winding and forming of field windings in one continuous set of operations. Further, such a tool is needed which minimizes the possibility of damaging the insulation on the windings. The present invention fulfills these needs and provides other related advantages.

SUMMARY OF THE INVENTION

The present invention resides in an improved tool for winding and forming dynamoelectric machine field windings which satisfies the foregoing needs. The tool comprises, generally, an elongated winding spindle, a forming rack movably disposed within the winding spindle, and actuating means for extending and retracting the forming rack generally radially from the winding spindle through a rack aperture in an external surface of the winding spindle. Means are further provided for guiding a wire through the winding spindle to a wire aperture in a radially facing external surface of the winding spindle.

In a preferred form of the invention, the elongated winding spindle is generally cylindrical and has generally radially extending slots therethrough located at longitudinally spaced apart locations along the winding spindle. A plurality of forming racks are provided, each of the forming racks are slidably disposed within one of the generally radially extending slots. A rotatable shaft is at least partially disposed within the winding spindle for engaging the forming racks in a manner causing sliding movement of the forming racks along the slots in response to rotation of the shaft. More particularly in this regard, the forming racks each include a rack of gear teeth, and the shaft comprises a pinion gear. The rotatable shaft has a longitudinal axis disposed parallel to a longitudinal axis of the winding spindle. The forming racks each slide along an axis perpendicular to the longitudinal axis of the rotating shaft.

In one embodiment, the wire guiding means includes a replaceable wire feeding insert disposed within a generally longitudinally extending cavity within the winding spindle. The wire feeding insert guides the wire from one end of the winding spindle to the vicinity of the wire aperture. The wire guiding means further includes a wire access recess in the external surface of the winding spindle adjacent to the wire aperture. A wire access recess insert is removably attached to the winding spindle within the wire access recess such that the wire access recess insert and an adjacent portion of the winding spindle define the wire aperture.

In a further embodiment, the wire guiding means includes wire slots defined in the winding spindle for guiding a plurality of wires from an interior of the winding spindle to a plurality of respective wire apertures. The wire slots and wire apertures are defined between separable upper and lower portions of the winding spindle.

Means are provided for biasing the shaft to normally position the forming racks within the winding spindle in the absence of a positive rotating force applied to the shaft. The biasing means includes a spring having one end fixed relative to the shaft and another end fixed relative to the winding spindle.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an enlarged top plan and front elevational perspective view of the winding and forming tool shown in FIG. 1 and comprising the present invention, wherein a top cap is removed to show an upper end of a spindle shaft extending through a spring retainer cap, and further illustrating an exemplary stator in phantom;

FIG. 4 is an exploded perspective view of the top end of the winding and forming tool shown in FIG. 3, illustrating the top cap to be attached over the spring retainer cap and fixed to the upper end of the spindle shaft;

FIG. 5 is a top plan view of an exemplary stator housing;

FIG. 6 is a top plan and front elevational perspective view of the stator housing shown in FIG. 5, further illustrating the manner in which field windings are assembled thereto;

FIG. 7 is an exploded perspective view of the components of the winding and forming tool illustrated in FIG. 3;

FIG. 8 is a sectional view of the winding spindle taken generally along the line 8—8 of FIG. 7;

FIG. 9 is a partially sectional view of the winding spindle taken generally along the line 9—9 of FIG. 8;

FIG. 10 is an enlarged sectional view of a wire feeding insert taken generally along the line 10—10 of FIG. 7;

FIG. 11 is an enlarged, partially sectional view taken generally along the line 11—11 of FIG. 9;

FIG. 12 is an enlarged fragmented sectional view taken generally along the line 12—12 of FIG. 11;

FIG. 13 is an enlarged sectional view taken generally along the line 13—13 of FIG. 9, illustrating a rack in its retracted position;

FIG. 14 is an enlarged sectional view taken generally along the line 13—13 of FIG. 9, illustrating the rack in an extended position;

FIG. 17 is an exploded perspective view of the components of a further embodiment of the winding and forming tool of the present invention;

FIG. 19A is a perspective view of the winding and forming tool of FIG. 17 having a stator housing positioned over a portion thereof, wherein the forming racks are in their extended positions; and FIG. 19B is a perspective view illustrating the rotatable shaft and forming rack components in the extended position of FIG. 19A.

DETAILED DESCRIPTION OF THE PREFERRED EMBODIMENT

Figure 1:
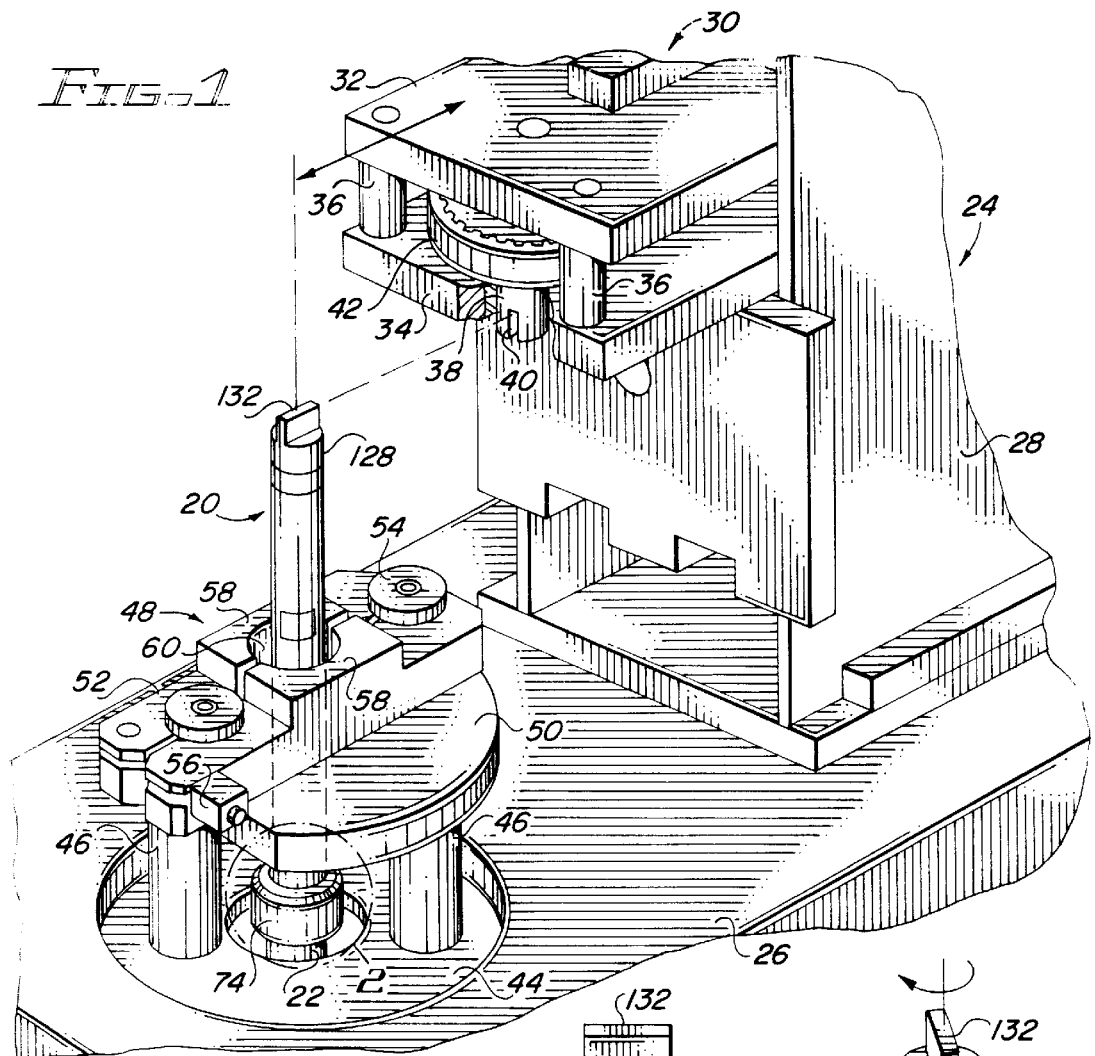
FIG. 1 is a fragmented perspective environmental view illustrating a winding and forming tool manufactured in accordance with the present invention, mounted to a winding machine spindle shaft.

As shown in the drawings for purposes of illustration, the present invention is concerned with an improved tool for winding and forming dynamoelectric machine field windings, generally designated in the accompanying drawings by the reference number 20. The winding and forming tool 20 is typically mounted onto a winding machine spindle shaft 22 which is part of a stator winding machine 24.

With reference to FIG. 1, the exemplary stator winding machine 24 includes a base 26 on which is positioned a vertically adjustable support structure 28 for a linear slide table 30. The linear slide table 30 includes an upper plate 32 and a lower plate 34 spaced by bushings 36. A cap rotator 38 having a vertical slot 40 is rotatably positioned by a pulley drive 42 which is situated between the upper and lower plates 32 and 34. The linear slide table 30 extends horizontally from the support structure 28 to engage the cap rotator 38 with an upper portion of the winding and forming tool in a manner to be described more fully below.

Adjacent to the support structure 28 is an aperture in the base 26 in which is positioned a rotatable index table 44. Extending upwardly from the index table 44 are several support legs 46 which support a stator nest clamp assembly 48. The clamp assembly 48 includes a stationary nest clamp 50 which is securely attached to the index table 44 by the support legs 46, and a pivotal nest clamp 52 which rotates about a pivot post 54 at one end and is secured to the stationary nest clamp 50 at another end with a lock nut 56. Each nest clamp 50 and 52 includes a central stator clamping section 58 having an internal semi-cylindrical clamping face 60 which engages an outer cylindrical surface of a stator 62 for securely holding the stator in place. For purposes of illustration only, the stator 62 is not shown in FIG. 1, although it will be readily understood by those of ordinary skill in the art that a stator is secured by the clamp assembly 48 during the winding and forming operation.

With reference to FIGS. 5 and 6, the exemplary stator 62 comprises an internally slotted, laminated stator core member 64 encased within a cylindrical stator housing sleeve 66. Internally, the core member 64 includes a plurality of poles 68 which define therebetween winding slots 70. The winding slots 70 need not extend vertically the length of the stator 62, but may have a skew angle which is defined as the angular difference between the top and bottom ends of any one particular winding slot perpendicular to a longitudinal axis of the stator 62. In the case of the exemplary stator 62 shown, wherein the winding slots extend vertically, the skew angle is zero degrees (0°).

In accordance with the present invention, and with specific reference to FIGS. 2–4 and 7–16, the winding and forming tool 20 comprises a generally cylindrical, elongated winding spindle 72 which has an integral collar 74 at a lower end which is secured to an upper end of the winding machine spindle shaft 22 by means of lock bolts 76. An internal cavity 78 is provided within the winding spindle 72, extending upwardly from its lower end, into which is inserted a wire feeding insert 80. The wire feeding insert 80 includes a wire guide passageway 82 which is preferably aligned with the longitudinal axis of the winding spindle 72. The wire feeding insert 80 also includes a peripheral groove 84 for receiving a set screw through an aligned aperture 86 in a wall of the winding spindle 72 (see FIGS. 8–10). The wire feeding insert 80 provides means for guiding an insulated wire 88 internally through the winding spindle 72 from a lower end thereof to the vicinity of a wire exit aperture 90 in a radially facing external surface of the winding spindle.

The winding spindle 72 includes a wire access recess 92 (FIG. 7) adjacent to the wire exit aperture 90. The recess 92 is configured to receive a wire access recess insert 94 which is held in place by means of insert screws 96. The insert 94 and an adjacent portion of the winding spindle 72 define the wire exit aperture 90. As best seen in FIGS. 7–9, 11 and 12, removal of the insert 94 from the recess 92 permits access to a terminal end of the wire feeding insert 80 to ensure passage of the wire through the wire exit aperture 90.

An upper portion of the winding spindle 72 includes a longitudinally extending internal cavity 98 having a longitudinal axis extending parallel to but spaced radially from the longitudinal axis of the winding spindle 72 itself. This portion of the winding spindle further includes a pair of longitudinally spaced apart, generally radially extending slots 100 which each slidably receive therein a respective forming rack 102. The distance between slots 100 and, thus, the forming racks 102 generally corresponds with the length of the stator 62. Also, the racks 102 may be angularly displaced from one another radially along the longitudinal axis of the winding spindle 72 such that the angular displacement corresponds with the skew angle of the winding slots 70. As shown, the skew angle is zero degrees, therefore the slots 100 and the forming racks 102 are vertically aligned with one another.

Each of the forming racks 102 includes a centrally disposed closed slot 104 having a rack of gear teeth 106 along one side of the slot 104. These gear teeth 106 engage the gear teeth of a rotatable spline shaft 108 which is disposed within and along the entire length of the upper internal cavity 98. Rotation of the shaft 108 causes the forming racks 102 to extend and retract from the winding spindle 72, in unison, in accordance with rotation of the shaft 108.

The upper end of the winding spindle 72 includes three recesses. Two of these recesses 110 are threaded to receive retaining screws 112 utilized to secure a spring retainer cap 114 onto the upper end of the winding spindle 72. The third recess 116 receives an end 118 of a coil spring 120 which is positioned about an upper end of the spline shaft 108 within the upper internal cavity 98. An opposite end of the coil spring 120 is disposed to engage the gear teeth of the spline shaft 108 so that the spring 120 provides means for biasing the shaft 108 to normally position the forming racks 102 within the winding spindle 72 in the absence of a positive rotating force applied to the shaft 108.

As shown in FIGS. 4 and 7, an upper end 122 of the shaft 108 extends through the spring retainer cap 114. This upper end 122 includes a pair of recesses 124 spaced for alignment with a pair of threaded apertures 126 in a top cap 128. The top cap 128 is placed over the upper end 122 of the spline shaft 108 and retaining screws 130 are threaded through the apertures 126 for engagement into the recesses 124 to secure the top cap 128 in place at the upper end of the winding and forming tool 20. The top cap 128 includes a flange-like upper key 132 which may be engaged by the vertical slot 40 of the cap rotator 38.

Figure 2:
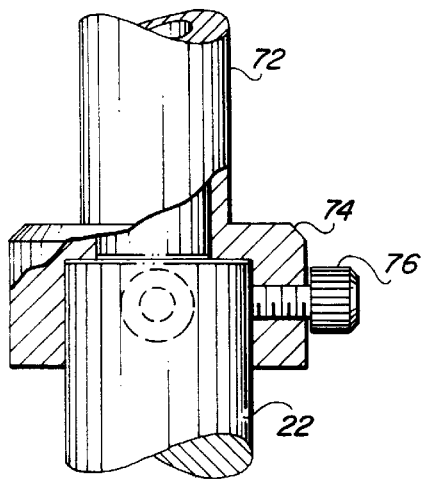
FIG. 2 is a fragmented, partially sectional view taken of the area indicated by the arrow 2 in FIG. 1, illustrating the manner in which a collar is formed integrally with a winding spindle, which collar is attached to an upper end of the winding machine spindle shaft.

In use, the winding and forming tool 20 is secured to the stator winding machine 24 by attaching the collar 74 to the winding machine spindle shaft 22 (FIG. 2). The winding machine spindle shaft reciprocates the winding and forming tool 20 vertically to pull wire 88 through the wire exit aperture 90 and wind it through the selected winding slots 70 of the stator 62. The winding machine spindle shaft 22 also pivots at each end of the upward and downward stroke thereof to facilitate this winding of the wire 88 onto the stator 62.

Figures 15, 16:
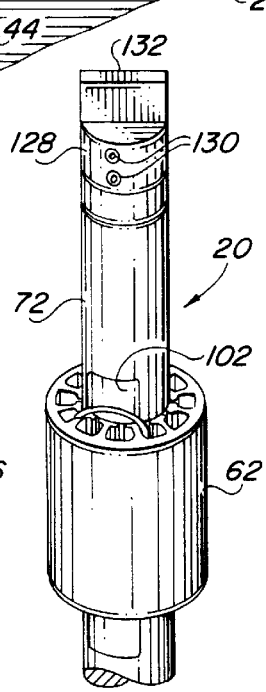
FIG. 15 is a fragmented perspective view of the winding and forming tool of the present invention having a stator housing positioned over a portion thereof, wherein the forming racks are in their retracted positions.
FIG. 16 is a view similar to that shown in FIG. 15, wherein the top cap has been rotated to extend the forming racks radially outwardly.

The stator 62 is placed over the winding and forming tool 20 as shown in FIG. 15, and clamped into place within the stator nest clamp assembly 48. Rotation of the index table 44 permits the stator winding machine to appropriately position the stator 62 for placing field windings within the entire inner circumference of the stator 62.

As the wire 88 being pulled through the wire exit aperture 90 is utilized to create electromagnetic coils within the stator 62, occasionally the end turn portions 134 of the coils must be pushed radially outwardly or "formed" to meet manufacturer's specifications. At suitable junctures during the winding process, the linear slide table 30 extends from the support structure 28 so that the vertical slot 40 of the cap rotator 38 engages the key 132 of the top cap 128. The cap rotator is then caused to pivot by means of the pulley drive 42, thus turning the top cap 128 relative to the winding spindle 72. This causes the spline shaft 108 to likewise rotate, thus causing the forming racks 102 to extend outwardly from the winding spindle 72 to engage the end turn portions 134 of the coils. When the required forming operation is completed, the cap rotator 38 disengages from the top cap 128, and the coil spring 120 ensures that the spline shaft 108 is rotated to retract the forming racks 102 completely within the winding spindle 72 (FIGS. 13–16).

From the foregoing it will be appreciated that the tool 20 of the present invention incorporates both a winding tool and an end-turn forming tool into a single apparatus, thus permitting both operations to be accomplished using a single tool. Additionally, by utilizing a pair of forming racks 102 spaced substantially to coincide with the length of the stator 62, both ends of the stator coils may be formed at the same time. The radius of the tool 20 is designed to closely match the desired radius of the coil. This approach greatly reduces the chance of damage to the individual wires of the coil since little force is applied to the wire strands at the entrance and exit of the stator slots where they are most vulnerable to forming damaged caused by pinched wires.

Of course, the winding and forming tool 20 could be modified to wind and form plural sets of coils in a single operation. All that need be added are additional forming racks 102 which operate along the same principles as those shown in the exemplary embodiment. Such a modified winding and forming tool is illustrated in FIGS. 17, 18A, 18B, 19A and 19B as a further embodiment wherein elements corresponding to elements of the first embodiment are labeled with the same reference numeral increased by 200. In particular, as seen in FIG. 17, the winding and forming tool 220 of the present invention comprises a generally cylindrical, elongated winding spindle formed of an upper portion 272a and a lower portion 272b. An internal cavity 278 (FIGS. 18A and 19A) is formed in the lower portion 272b leading to a funnel-shaped area 279 at an upper end of the lower portion 272b.

Figure 18B:
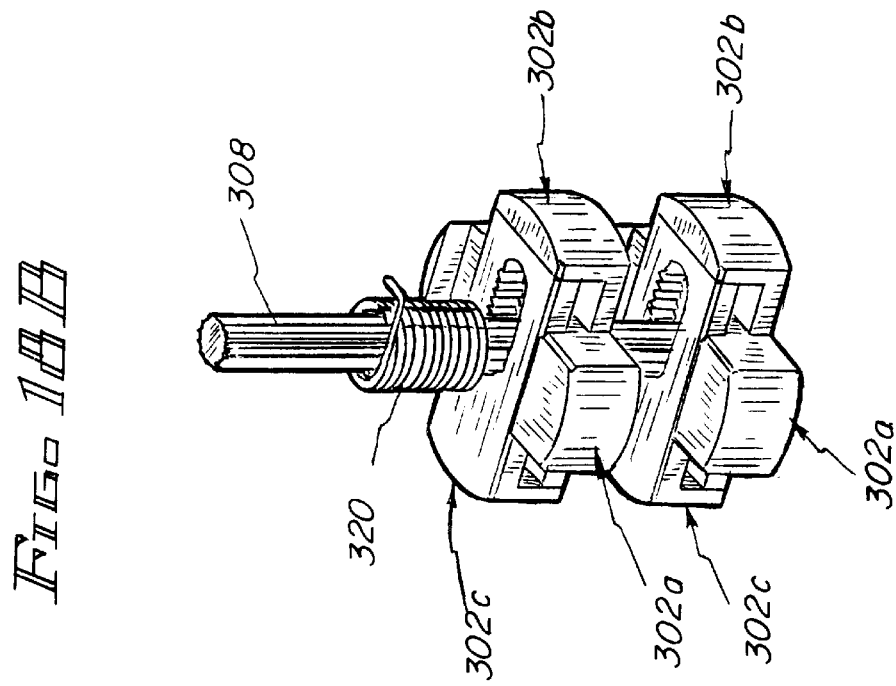
FIG. 18B is a perspective view illustrating the rotatable shaft and forming rack components in the retracted position of FIG. 18A.
Figure 18A:
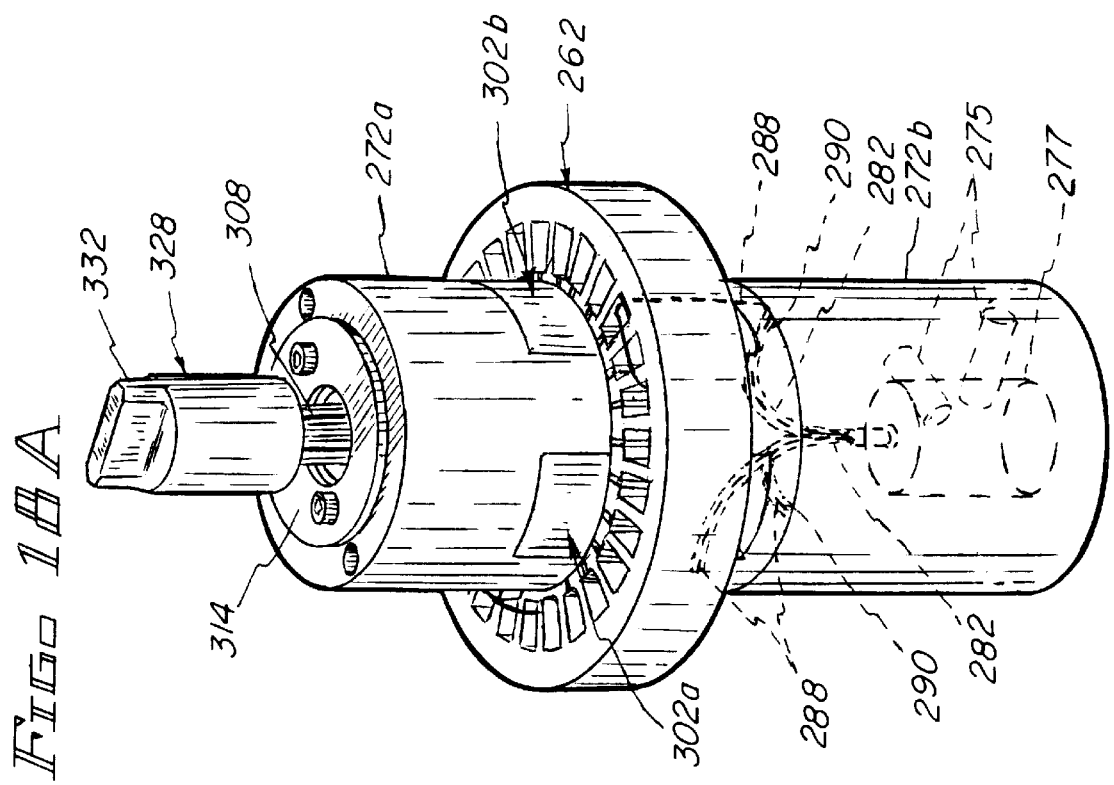
FIG. 18A is a perspective view of the winding and forming tool of FIG. 17 having a stator housing positioned over a portion thereof, wherein the forming racks are in their retracted positions.

The upper portion 272a of the winding and forming tool 220 is provided with a cooperating wire guide portion 281 at its lower end. The wire guide portion 281 is formed with a shape for cooperating with the funnel-shaped area 279 and includes slots or grooves 283 (preferably three grooves)

which, when cooperating with the funnel-shaped area 279, define a plurality of wire guide passageways 282 (FIGS. 18A and 19A). The wire guide passageways 282 guide wires 288 from the interior of the winding and forming tool 220 to respective apertures defined by notches 285, 287 formed in radially facing external surfaces of the upper and lower portions 272a, 272b, respectively. The upper and lower portions 272a, 272b are held together in assembled relation by retaining screws 289 extending through apertures 291 in the upper portion 272a and into threaded engagement with apertures 293 in the lower portion.

The upper winding spindle portion 272a includes a longitudinally extending internal cavity 298 having a longitudinal axis extending along the longitudinal axis of the upper winding spindle portion 272a. The upper winding spindle portion 272a further includes two sets of longitudinally spaced apart, generally radially extending slots 300a, 300b. The slots 300a each slidably receive therein a respective forming rack 302a, and the slots 300b each slidably receive therein a pair of respective forming racks 302b and 302c.

Each of the forming racks 302a, 302b, 302c includes a respective slide body portion 303, and a respective wire forming end portion 305. Each of the slide bodies 303 includes a centrally disposed closed slot 304 having a rack of gear teeth 306 along one side of the slot 304. These gear teeth 306 engage the gear teeth of a rotatable spline shaft 308 disposed within the upper winding spindle portion 272a. Rotation of the shaft 308 causes the forming racks 302a, 302b, 302c to extend and retract from the upper winding spindle portion 272a, in unison.

It should be noted that the forming racks 302a, 302b, 302c disposed in each set of slots 300a, 300b are circumferentially displaced relative to each other, and in the illustrated embodiment, are circumferentially displaced 90° relative to each other. Further, the slots 300a, 300b of each set of slots intersect each other such that each set of forming racks 302a, 302b, 302c are positioned in stacked engagement with each other and move in sliding relation relative to each other in response to rotation of the shaft 308. It should also be understood that the circumferential displacement of the racks 302a, 302b, 302c relative to each other may be altered depending on the desired circumferential location of the wire exit apertures 290. For example, an additional slot intersecting the slots 300a and 300b may be provided in order to position the forming racks 302a, 302b, 302c at locations displaced 120° from each other.

As in the previous embodiment, a coil spring 320 is engaged with a recess 316 on an upper end of the upper winding spindle portion 272a. The spring 320 surrounds the spline shaft 308 to provide means for biasing the shaft 308 to normally position the forming racks 302a, 302b, 302c within the upper winding spindle portion 272a in the absence of a positive rotating force applied to the shaft 308.

Also, a retainer cap 314 is attached to the upper winding spindle portion 272a by retaining screws 312, and a C-clip 321 is engaged around the spline shaft 308 to axially retain the spline shaft relative to the retainer cap 314. A top cap 328 having an upper key 332 is attached to an upper end of the spline shaft 308 by means of retaining screws 330 threaded through apertures 326.

As seen in FIGS. 18A and 19A, the internal cavity 278 of the lower winding spindle portion 272b includes a spindle shaft receptor opening 277 for securing to an upper end of a winding machine spindle shaft. Threaded apertures 275 are also provided extending to the opening 277 whereby lock bolts (not shown) may be provided for locking the lower spindle portion 272b to the spindle shaft.

Referring to FIGS. 18A and 18B, the forming racks 302a, 302b, 302c are illustrated in their retracted position. In this position, the winding and forming tool 220 may be used to wind wire onto a stator 262. Further, when the key 332 is engaged by a cap rotator to cause the spline shaft 308 to rotate, the forming racks are caused to move radially outwardly to their extended position, as shown in FIGS. 19A and 19B. In this position, the ends 305 of the forming racks 302a, 302b, 302c engage the end turn portions of coils formed on the stator 262.

Thus, it should be apparent that the present embodiment operates in generally the same manner as the previous embodiment to wind and form coils on a stator, and further is configured to simultaneously wind and form a plurality of coils on a stator.

Although particular embodiments of the invention have been described in detail for purposes of illustration, various modifications may be made without departing from the spirit and scope of the invention. Accordingly, the invention is not to be limited, except as by the appended claims.

I claim:

1. A tool for winding and forming dynamoelectric machine field windings, comprising:

an elongated winding spindle defining a longitudinal spindle axis and having generally radially extending slots therethrough located at longitudinally spaced apart locations along the winding spindle;

a plurality of forming racks, each of the forming racks being slidably disposed within one of the generally radially extending slots and defining respective end faces;

means for guiding the forming racks in radially extending movement perpendicular to the longitudinal axis of the winding spindle said means for guiding the forming racks comprising radially extending guide surfaces extending inwardly from a radially facing external surface of the spindle, and said means for guiding the forming racks further comprising radially extending surfaces on the forming racks cooperating in sliding engagement with respective ones of the guide surfaces on the spindle;

actuating means for extending and retracting the forming racks relative to the winding spindle whereby the forming racks move to position said end faces of said racks from locations adjacent to said radially facing surface to locations spaced radially outwardly from said radially facing surface;

a wire aperture defined in the radially facing external surface of the winding spindle for receiving a wire; and means for guiding wire internally through the winding spindle from one end thereof to the wire aperture defined in the radially facing external surface of the winding spindle.

2. The tool of claim 1, wherein the wire guiding means includes a replaceable wire feeding insert disposed within a generally longitudinally extending cavity within the winding spindle and wherein said wire feeding insert guides the wire from the one end of the winding spindle to the vicinity of the wire aperture.

3. The tool of claim 2, wherein the wire guiding means further includes a wire access recess in the external surface of the winding spindle adjacent to the wire aperture, and a wire access recess insert removably attached to the winding spindle within the wire access recess, wherein the wire access recess insert and an adjacent portion of the winding spindle define the wire aperture.

4. The tool of claim 1, wherein the extending and retracting means comprises a rotatable shaft at least partially disposed within the winding spindle for engaging the forming racks in a manner causing sliding movement of the forming racks along the slots in accordance with rotation of the shaft.

5. The tool of claim 4, wherein the rotatable shaft has a longitudinal axis disposed parallel to a longitudinal axis of the winding spindle, and wherein the forming racks each slide along an axis perpendicular to the longitudinal axis of the rotatable shaft.

6. The tool of claim 4, wherein the forming racks each include a rack of gear teeth, and wherein the shaft comprises a pinion gear.

7. The tool of claim 6, including means for biasing the shaft to normally position the forming racks within the winding spindle in the absence of a positive rotating force applied to the shaft.

8. The tool of claim 7, wherein the biasing means includes a spring having one end fixed relative to the shaft and another end fixed relative to the winding spindle.

9. The tool of claim 1, wherein a set of slots are defined at each of the spaced apart locations on the winding spindle and a plurality of forming racks are slidably disposed in each set of slots, the forming racks associated with each set of slots being oriented in circumferentially displaced relation relative to each other.

10. The tool of claim 9, wherein the forming racks disposed in each set of slots are positioned in stacked engagement with each other such that each forming rack is in sliding engagement with an adjacent one of the forming racks.

11. The tool of claim 9, wherein three forming racks are disposed in each set of slots.

12. The tool of claim 9, including a plurality of wire apertures equal in number to the number of forming racks in each of the sets of slots, each wire aperture communicating with the means for guiding wire internally through the winding spindle.

13. The tool of claim 9, wherein the forming racks each include a rack of gear teeth, and wherein the actuating means comprises a shaft forming a pinion gear extending through the winding spindle and engaging the gear teeth on the forming racks.

14. A tool for winding and forming dynamoelectric machine field windings, comprising:

an elongated winding spindle defining a longitudinal axis and including a radially facing external face;

a plurality of elongated forming racks movably disposed within the winding spindle, each of said forming racks defining a respective longitudinal forming rack axis extending perpendicular to the longitudinal spindle axis and including an end face;

means for guiding each said forming rack in radially extending linear movement;

said means for guiding each said forming rack comprising radially extending guide surfaces extending inwardly from the radially facing surface of the spindle, and further including radially extending surfaces on the forming racks cooperating in sliding engagement with respective ones of the guide surfaces on the spindle;

means for extending and retracting the forming racks from the winding spindle whereby the forming racks move lengthwise along paths generally parallel to the respective longitudinal forming rack axes and said end faces move from locations adjacent to said radially facing surface to locations spaced radially outwardly from said radially facing surfaces; and at least one aperture defined in said radially facing external surface for guiding a winding wire from a location inside said winding spindle to a location outside said winding spindle.

15. The tool of claim 14, wherein said means for extending and retracting the forming racks causes all of the forming racks to simultaneously move radially outwardly.

16. The tool of claim 14, wherein the means for extending and retracting the forming racks comprises a rotatable shaft engaged with the forming racks in a manner causing sliding movement of the forming racks through the winding spindle in response to rotation of the shaft.

17. The tool of claim 16, wherein the rotatable shaft has a longitudinal axis disposed parallel to the longitudinal axis of the winding spindle, and wherein the forming racks each slide along an axis perpendicular to the longitudinal axis of the rotatable shaft.

18. The tool of claim 16, wherein the forming racks each include a rack of gear teeth, and wherein the shaft comprises a pinion gear.

19. The tool of claim 18, including means for biasing the shaft to normally position the forming racks within the winding spindle in the absence of a positive rotating force applied to the shaft.

20. The tool of claim 14, wherein the forming racks are disposed within respective slots extending through the winding spindle and each forming rack is in sliding engagement with an adjacent forming rack.

* * * * *